R. HUFF.
LEVER MECHANISM.
APPLICATION FILED JULY 27, 1910.

1,117,385. Patented Nov. 17, 1914.

Witnesses:
M. C. Bender,
M. G. Crandell

Inventor:
Russell Huff

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

LEVER MECHANISM.

1,117,385.  Specification of Letters Patent.  Patented Nov. 17, 1914.

Original application filed May 7, 1908, Serial No. 431,386. Divided and this application filed July 27, 1910. Serial No. 574,173.

*To all whom it may concern:*

Be it known that I, RUSSELL HUFF, a citizen of the United States, and resident of Detroit, Wayne county, State of Michigan, have invented certain new and useful Improvements in Lever Mechanism, of which the following is a specification.

This invention relates to motor vehicles and particularly to the control levers thereof and their connections.

In motor vehicle construction it is desirable to obtain great strength of the various operating parts, together with extreme lightness. To this end the present invention involves an arrangement of nested rock shafts with operating levers attached thereto so as to obtain great strength where most needed without unduly increasing weight.

The invention will be particularly described in connection with the accompanying drawings, in which—

Figure 1:
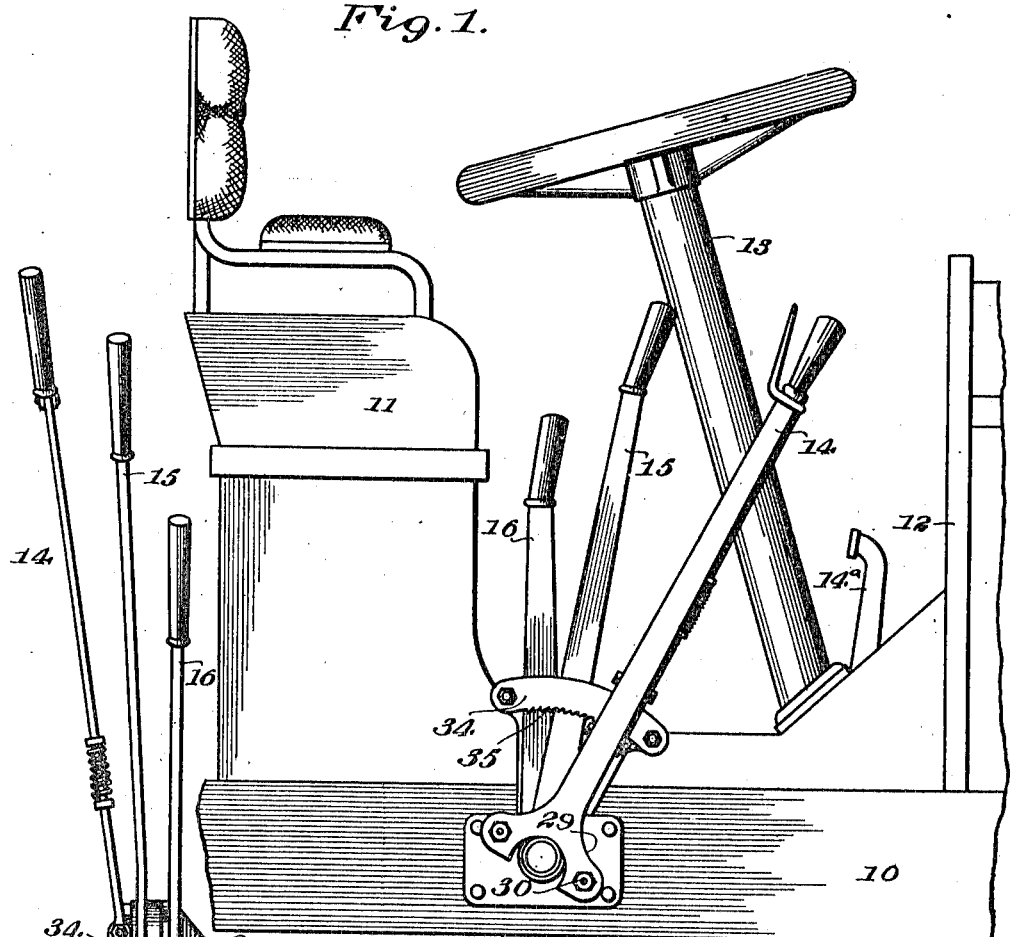
Figure 2:
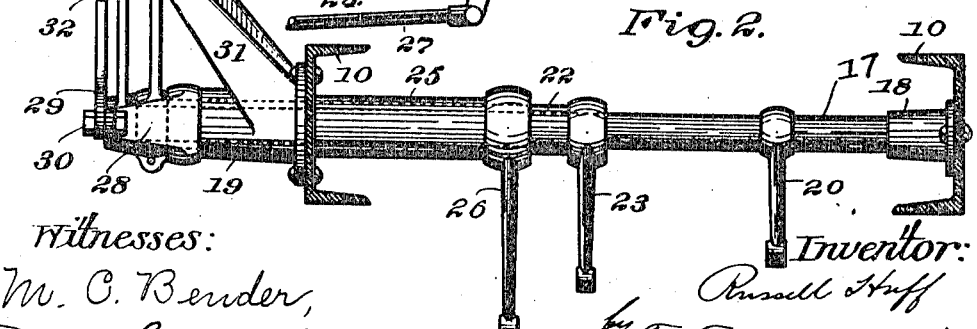

Figure 1 is a side elevation of a portion of a motor vehicle having control mechanism embodying this invention; and Fig. 2 is a transverse view illustrating the arrangement of operating levers and shafts.

Referring to the drawings in which a motor truck is illustrated, 10 represents the side members of the frame upon which the driver's seat 11 and the dash 12 are mounted. The steering post 13 and the clutch pedal 14ᵃ are mounted conveniently to the driver's seat as are also the hand brake lever 14, the change speed lever 15 and the reverse lever 16.

In motor vehicle construction it is desirable that the hand brake lever shall be outside of the lever or levers controlling the gears or other devices of the vehicle and it is necessary that the rock shaft to which this lever is connected shall have sufficient strength to withstand the great strains which may be put upon it by the operator in the application of the brakes. Not nearly so much strength is necessary in the shafts to which the change speed and reverse levers 15 and 16 are connected, as very little effort is required to operate the gears to which these levers are connected.

With the three levers 14, 15 and 16 connected in the ordinary manner respectively with three nested shafts the innermost shaft would be connected with the outer lever 14 and the outermost shaft would be connected with the inner lever 16; thus the brake lever 14 would be connected with the weakest of the three shafts and this innermost shaft would have to be made of large diameter to withstand the strains necessarily put upon it, thereby also increasing the diameter of the intermediate and outer shafts. This objection is avoided in the present invention, and a very satisfactory arrangement of levers and shafts is obtained. A rock shaft 17, which extends entirely across the vehicle and is supported in trunnions 18 and 19 secured to the members 10, is connected at its outer end with the change speed lever 15 and has an arm 20 suitably secured to it and connected with a rod 21 for shifting the change speed gears to their various positions. Said shaft 17 is surrounded by a shaft 22 which is connected at its outer end with the reverse lever 16 and is provided with an arm 23 connected with a rod 24 for operating the reverse gear. Surrounding the shaft 22 is a third shaft 25 having an arm 26 connected with a rod 27 for operating the brakes of the vehicle. The outer end of the shaft 25 is provided with a pair of arms 28 which extend in U form outwardly around the ends of the shafts 17 and 22, and a brake lever 14 is bifurcated at its lower end and the forks 29 thereof are bolted to the respective arms 28 as at 30.

By the above described construction and arrangement, the brake lever 14 is by a strong connection attached to the outer shaft 25 of the three nested shafts and the brakes are thereby operated through the strongest of said three shafts. A further advantage of this construction is that the shaft 25 is necessarily the shortest of the three nested shafts, thus rendering torsional strains less objectionable.

It will be noted that the trunnion 19 which supports the lever ends of the three shafts is provided with upwardly extending integral arms 31 to which are attached guiding members 32, 33 and 34 for guiding the oscillating movements of the levers, and in the case of the member 34 forming a ratchet 35 which coöperates with a latch on the brake lever 14 to lock the brake lever in desired position.

This application is a division of my former application, Serial No. 431,386, filed May 7, 1908.

Without limiting myself to the exact construction and arrangement shown, I claim:

1. The combination with a brake lever and a lever for shifting other elements of a motor vehicle, of a shaft to which the latter lever is connected, an outer concentric shaft, and supports on the latter shaft extended to support the brake lever beyond the inner shaft.

2. In a motor vehicle, the combination with the frame, of a plurality of concentric shafts extending transversely of the frame and projecting beyond one side thereof, substantially parallel operating levers mounted on the projecting ends of said shafts, guides engaging said levers and supported on said frame, and the lever for the inner shaft being arranged between the frame and the lever for the outer shaft.

3. The combination with the brake, change speed and reversing connections of a motor vehicle, of concentric shafts carrying operating levers, the brake shaft being outermost and provided with arms supporting the brake operating lever outside of the other levers.

4. In a motor vehicle, the combination with the change speed shaft and its operating lever, of a plurality of hollow shafts concentric with the change speed shaft, connections between the outer hollow shaft and the brake devices, and arms at the outer end of the brake shaft, and an operating lever carried by said arms in a position outside the other levers.

In testimony whereof I affix my signature in presence of two witnesses.

RUSSELL HUFF.

Witnesses:
C. I. DALE,
M. L. GILDEMEISTER.